United States Patent Office 3,573,304
Patented Mar. 30, 1971

3,573,304
1-DIMETHYLAMINO - 3 - METHYL-2(PYRIDYL OR PYRIDAZINYL)PENTANE AND THE CORRESPONDING NON-TOXIC ACID ADDITION SALTS THEREOF
Jeannine A. Eberle, Chatou, Yvelines, Micheline Y. Sergant, Clamart (Hauts-de-Seine), Claude P. Fauran, Paris, and Gerard J. Huguet, Malesherbes, Loiret, France, assignors to Delalande S.A., Hauts-de-Seine, France
No Drawing. Continuation-in-part of application Ser. No. 686,722, Nov. 29, 1967. This application Dec. 3, 1968, Ser. No. 780,914
Int. Cl. C07d 51/04, 31/42
U.S. Cl. 260—250                                3 Claims

ABSTRACT OF THE DISCLOSURE

A compound having utility as a cardiovascular agent, a diuretic agent or a spasmolytic agent and having the formula:

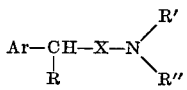

in which Ar is a hydrogen atom, an aromatic radical which may be mono or polysubstituted by groups of low molecular weight or a heterocyclic radical, R is a saturated or unsaturated linear or branched-chain radical having one to five carbon atoms and which may contain a functional group, R' and R" each is a hydrogen atom, an aliphatic radical having one to three carbon atoms or R' and R" plus the nitrogen form a heterocyclic radical, X is a carbonyl radical or a methylene radical and Ar also including a cyclic saturated radical when X is a methylene radical.

---

This application is a continuation-in-part of our copending application, Ser. No. 686,722 filed Nov. 29, 1967.

The present invention concerns, as new industrial products having a therapeutic activity, compounds of the formula:

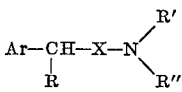   (1)

in which Ar represents a hydrogen atom, an aromatic radical, such as a phenyl, alpha-naphthyl or beta-naphthyl radical which radical if desired, may be mono or polysubstituted by groups of low molecular weight, for example, NH₂, NO₂, Cl or alkoxy of low molecular weight, or a heterocyclic radical, such as a thienyl, furanyl, quinolyl, benzimidazolyl, pyridyl, pyrazinyl or pyrimidinyl radical, R represents a saturated or unsaturated, linear or branched-chain aliphatic radical having one to five carbon atoms, which radical is capable of carrying a functional group such as, an ethoxy, dimethylamino or hydroxy group, R' and R" each represents a hydrogen atom or an aliphatic radical having one to three carbon atoms, or R' and R" together with the nitrogen atom may form a heterocyclic radical such as a piperidine, morpholine or pyrolidine radical and X represents a carbonyl or a methylene radical.

In addition, when X represents the methylene radical, Ar may represent a cyclic saturated radical such as cyclohexane or cyclopentane.

According to the present invention, the process for the preparation of the compounds of the general Formula 1 in which X is a carbonyl radical is characterized in that an acid of the general formula:

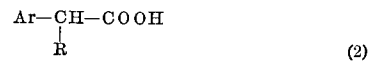   (2)

in which Ar and R have the above-mentioned meanings is reacted with a chlorinating agent such as thionyl chloride in order to obtain the corresponding acid chloride, which acid chloride is then reacted with an amine of the general formula:

   (3)

in which R' and R" have the above-mentioned meanings, and the desired compound thereby obtained is collected by usual means, such as evaporation of the solvent and recrystallization.

In a preferred embodiment, the various phases of the process of the present invention are effected in a suitable organic solvent such as benzene, the chlorination reaction is carried out at the reflux temperature of the reaction medium, whilst the amination reaction is carried out at a temperature between −10° C. and +10° C., preferably 0° C.

The acid of the general Formula 2 may be prepared either by alkylation of an acid of the general formula:

   (4)

with an alkyl halide of the general formula:

   (5)

in which Ar and R are as defined above, and Hal represents a halogen atom, the reaction being carried out in liquid ammonia or benzene and in the presence of sodamide and at the boiling temperature of the reaction medium, or by alkylation of a nitrile of the general formula:

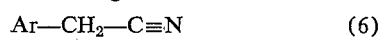   (6)

by the process described for alkylation of the acid of the general Formula 4 in order to obtain a substituted nitrile of the general formula:

   (7)

which is then hydrolyzed according to conventional processes.

According to a further embodiment of the present invention the compounds of the general Formula 1 in which X represents a carbonyl radical may also be prepared by alkylating an amide of the general formula:

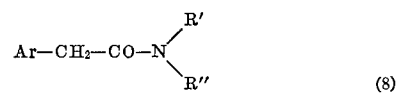   (8)

in which Ar, R' and R" have the above-mentioned meanings, with an alkyl halide of the general Formula 5 by the above-mentioned process or with a mixed oragnomagnesium compound of suitable formula.

According to the present invention, the process for the preparation of the compounds of the general Formula 1 in which X is a methylene radical is characterized in that compounds of Formula 1 in which X represents a carbonyl radical, and which are prepared as described above, are reduced by the action of a double hydride of lithium and aluminum or by catalytic hydrogenation and the desired compounds are collected by the usual means.

According to a further embodiment of the invention, these compounds may also be prepared from nitriles of Formula 7 which are reduced with a double lithium and aluminum hydride, or by catalytic hydrogenation so as to obtain the corresponding primary amine which is then alkylated on the nitrogen atom with an alkyl halide of the general formula:

$$\text{Hal—R' or Hal—R''} \quad (9)$$

in which R' and R'' have the above-mentioned meanings and Hal represents a halogen atom, or when R is $CH_3$ by the action of a formaldehyde-formic acid mixture.

In a particular method, given by way of example only, the amines of Formula 1 in which Ar is a heterocyclic radical may be prepared either by the Mannich reaction on derivatives of the general formula:

$$\text{Ar—CH}_2\text{—R} \quad (10)$$

in which Ar and R have the above-mentioned meanings by employing the amine corresponding to the desired derivative, or by the action of an alkyl halide of Formula 5 on the carbon atom in the α-position with respect to the heterocyclic radical of an amine of the general formula:

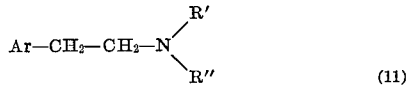

in which Ar is a heterocyclic radical, and R' and R'' are as defined above.

Since the compounds of general Formula 1 are bases, the present invention also concerns the salts they yield with mineral or organic acids.

According to the present invention, these salts are prepared by the action of selected acids on the corresponding base by conventional means.

The present invention will be further described with reference to the following nonlimitative examples.

EXAMPLE I

N,N-dimethyl-3-methyl-2-α-naphthyl pentanamide

According to the schematic process

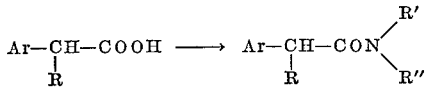

(a) 3-methyl-2-α-naphthyl pentanoic acid was first prepared by the process

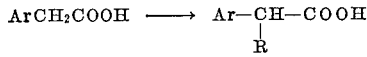

as follows:

A suspension of sodamide (1 mol) is prepared in liquid ammonium, and 0.5 mol of α-naphthyl acetic acid is added thereto. After half an hour (i.e., until an orange coloration is obtained), 0.5 mol of secondary butyl bromide is added. The mixture is left under reflux for two hours. After evaporation of the ammonia and hydrolysis, extraction is effected with ether.

The acid obtained is separated by distillation.

E/0.1=175° C. (yield=83%)

(b) Then the desired compound N,N-dimethyl-3-methyl-2-α-naphthyl pentanamide is prepared as follows:

2.22 mols of thionyl chloride are added to a benzene solution (100 ml.) of 0.73 mol of the acid thus prepared. After one hour under reflux, any excess thionyl chloride is removed.

Then a benzene solution (600 ml.) of the acid chloride thus prepared is added to a solution, cooled to 0° C., of dimethylamine (3 mols) in anhydrous ether. After treatment in water, the organic phase is washed with dilute soda. By evaporation of the benzene, a residue is obtained which is crystallized from isopropyl ether:

M.P.=110°-122° C. (yield=82%)

Analysis.—Calcd. for $C_{18}H_{23}NO$ (percent): N, 5.20. Found (percent): N, 5.22.

Certain compounds of the general Formula 1 in which X is a carbonyl radical and which were prepared by this process are shown in Table I.

TABLE I

| Ar | R | NR'R'' | Empirical formula | Molecular weight | N percent Theory | N percent Found | E° C./ p. mm.Hg | M.P., ° C. | $n^{20}$ |
|---|---|---|---|---|---|---|---|---|---|
| $C_6H_5$ | n-$C_5H_{11}$ | $N(CH_3)_2$ | $C_{15}H_{23}NO$ | 233.34 | 6.00 | 6.12 | 134-6/1.5 | | 1.5122 |
| $C_6H_5$ | n-$C_2H_5$ | $N(CH_3)_2$ | $C_{12}H_{17}NO$ | 191.26 | 7.32 | 7.63 | 121/3 | | 1.5265 |
| H | sec-$C_4H_9$ | $N(CH_3)_2$ | $C_8H_{17}NO$ | 143.22 | 9.78 | 9.67 | 98/16 | | 1.4471 |
| $C_4H_3S$ | sec-$C_4H_9$ | $N(CH_3)_2$ | $C_{12}H_{19}NOS$ | 225.35 | 6.21 | 5.96 | 120-125/0.6 | 50 | |

EXAMPLE II

N,N-dimethyl-2-(4-chlorophenyl)-4-methyl pentanamide (a) First 2-(4-chlorophenyl)-4-methyl pentanoic acid is prepared according to the schematic process.

as follows:

An ether solution of 4-chlorophenyl acetonitrile (0.2 mol) is added to a suspension of 0.2 mol sodamide in liquid ammonia. After 40 minutes 0.2 mol of secondary butyl bromide is added and the reaction is continued for one hour. Hydrolysis is then effected in the usual manner.

The distilled α-alkylated nitrile ($E_b$/0.5=199° C.) is obtained in a yield of 65%.

The alkylated nitrile (0.1 mol) is then hydrated for 12 hours under reflux by means of a mixture of equal parts of acetic acid, sulphuric acid and water. The reaction mixture is then diluted with water and extracted with ether. The volatile phase is removed by 5% soda solution. After acidification, an oily residue is obtained which is recrystallized in heptane: M.P.=115° C., yield=55%.

(b) According to the same schematic process as in Example I, the resultant acid (0.31 mol) is treated with thionyl chloride (0.8 mol) under reflux. After one hour the excess thionyl chloride is removed, and the residue in a benzene solution is treated directly with dimethylamine. After addition of water, the organic phase is decanted, dried and concentrated. In this way the desired product is obtained having a M.P.=70° C. and in a yield of 73%.

Analysis.—Calcd. for $C_{14}H_{20}ClNO$ (percent): N, 5.52. Found (percent): N, 5.46.

The compounds shown in Table II are prepared according to the process described in Example II.

TABLE II

| Ar | R | NR'R' | Empirical formula | Molecular weight | N percent Theory | N percent Found | E°C./p. mm. Hg | M.P., °C. | $n^{20}$ |
|---|---|---|---|---|---|---|---|---|---|
| p. $NO_2C_6H_4$ | sec-$C_4H_9$ | $N(CH_3)_2$ | $C_{14}H_{20}N_2O_3$ | 264.32 | 10.60 | 10.70 | | | |
| p. $NH_2C_6H_4$ | sec-$C_4H_9$ | $N(CH_3)_2$ | $C_{14}H_{22}N_2O$ | 234.33 | 11.96 | 11.87 | | 110 | |
| p. $NH_2C_6H_4$ | sec-$C_4H_9$ | $N(CH_3)_2$ HCl salt | $C_{14}H_{23}ClN_2O$ | 270.79 | 10.35 | 10.15 | | 210 | |

EXAMPLE III

N,N-dimethyl-2-phenyl-4 pentynamide

This compound is obtained according to the schematic process

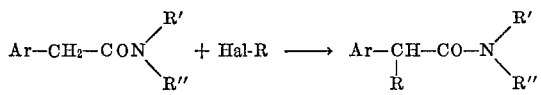

as follows:

An ether solution of N,N-dimethyl-phenyl acetamide (0.16 mol) is added to a suspension of sodamide (0.16 mol) in liquid ammonia. After one quarter of an hour a volatile solution of propargyl bromide (0.16 mol) is added and the reaction continued for a further one hour. After evaporation of the ammonia and hydrolysis, extraction is effected with ether. By distillation (E/0.2=135° C.) 18.5 g. of the desired product is obtained.

*Analysis.*—Calcd. for $C_{13}H_{15}NO$ (percent): N, 6.96. Found (percent): N, 6.96.

According to the same process, N,N-dimethyl-2-phenyl-4 pentenamide was prepared: $E_b/0.15 = 137 – 138°$ C.

*Analysis.*—Calcd. for $C_{13}H_{17}NO$ (percent): N, 6.88. Found (percent): N, 6.96.

EXAMPLE IV

N,N-dimethyl-5-dimethylamino-2-phenyl pentanamide

According to the same schematic process as in Example III, N,N-dimethyl-5-dimethylamino-2 phenyl pentanamide was prepared as follows:

0.5 mol of sodamide was added to a benzene solution of 0.5 mol N,N-dimethyl phenyl acetamide. After two hours under reflux, the mixture is cooled to 40° C. and a benzene solution of 0.5 mol of dimethylaminochloropropane is added. The solution is kept under reflux for a further four hours. Hydrolysis is effected and by treatment of the organic phase a residue is obtained which is distilled (E/0.25=150° C.) (yield=40%).

*Analysis.*—Calcd. for $C_{15}H_{24}NO$ (percent): N, 11.28. Found (percent): N, 11.15.

Certain compounds of the general Formula 1 in which X is a carbonyl radical and which were prepared according to the process described in Example IV are shown in Table III.

EXAMPLE V

N,N-dimethyl-3-hydroxy-3-methyl-2-phenyl pentanamide

This compound was prepared by the action of a mixed organomagnesium compound on a compound at formula:

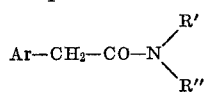

as follows:

An ether solution of 0.5 mol of isopropyl magnesium bromide is added to a benzene solution of 0.5 mol of N,N-dimethyl-phenylacetamide. After heating for one hour under reflux 0.5 mol of 2-butanone is introduced. The solution is kept under reflux for two and one-half hours. After hydrolysis in a hydrochloric acid medium and extraction with ether, an oily residue is obtained which is crystallized from hexane M.P.=68° C. (yield=60%).

*Analysis.*—Calcd. for $C_{14}H_{21}NO_2$ (percent): N, 5.95. Found (percent): 6.19.

EXAMPLE VI

1-dimethylamino-3-methyl 2-(alpha-naphthyl)-pentane

This compound, which illustrates the preparation of the derivatives of Formula 1 in which X is a methylene radical, is prepared by the schematic process

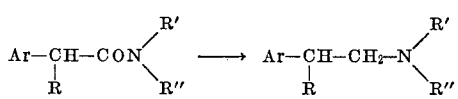

as follows:

0.1 mol of N,N-dimethyl-3-methyl-2-(alpha naphthyl) pentanamide prepared according to Example I, is added to a suspension of 0.1 mol of $LiAlH_4$ in 300 ml. anhydrous ether.

After four hours under reflux, hydrolysis is effected. After filtration, the volatile solution is extracted with 4N-HCl and the organic compound which is salted out is distilled.

E/0.3=133–135° C. (yield=75%)

*Analysis.*—Calcd. for $C_{18}H_{25}N$ (percent): C, 84,65; H, 9.87; N, 5.48. Found (percent): C, 84.45; H, 9.81; N, 5.37.

Its hydrochloride melts at 224° C.

*Analysis.*—Calcd. for $C_{19}H_{26}NCl$ (percent): C, 74.07; H, 8.98; N, 4.80; Cl, 12.15. Found (percent): C, 74.27; H, 9.06; N, 4.84; Cl, 12.13.

EXAMPLE VII

1-dimethylamino-3-methyl-2-[(5-chloro-2-methoxy) phenyl]pentane

According to the same process as that of Example VI, 1-dimethylamino-3-methyl - 2 - [(5 - chloro-2-methoxy) phenyl] pentane was prepared as follows:

A solution of N,N-dimethyl (2-methoxy-5-chloro) phenyl acetamide (0.78 mol) is added to a suspension of sodamide in liquid ammonia and is then treated with 0.78 mol of secondary butyl bromide. After two hours, hydrolysis and extraction with ether is effected. By concentration of the volatile solution, a crude product is obtained which, after chromatographic analysis, is directly treated with $AlLiH_4$ (0.69 mol) in anhydrous ether. After four hours under reflux and addition of water and soda, the amine is obtained which is distilled:

E/1.5=115° C. (75%)

*Analysis.*—Calcd. for $C_{15}H_{24}ClNO$ (percent): C, 66.77; H, 8.97; N, 519. Found (percent): C, 66.74; H, 8.98; N, 5.39.

After dissolving in ethanol and treatment with gaseous hydrochloric acid, the hydrochloride is obtained which is dried and is then recrystallized in acetone.

M.P.=178° C.

TABLE III

| Ar | R | NR'R" | Empirical formula | Molecular weight | N percent Theory | N percent Found | E°C./p. mm. Hg | M.P., °C. | $n^{20}$ |
|---|---|---|---|---|---|---|---|---|---|
| $C_6H_5$ | $C_5H_{11}$ iso | $N(CH_3)_2$ | $C_{15}H_{23}NO$ | 233.34 | 6.00 | 6.05 | 131-3/1.5 | | 1.5128 |
| $C_6H_5$ | $C_3H_7$ iso | $N(CH_3)_2$ | $C_{13}H_{19}NO$ | 205.29 | 6.82 | 6.94 | 121-4/3 | 60 | |
| $C_6H_5$ | $C_4H_9$ sec. | N◯O | $C_{16}H_{23}NO$ | 261.35 | 5.36 | 5.43 | 137-9/0.1 | | 1.5339 |
| $C_6H_5$ | $nC_3H_7$ | $N(CH_3)_2$ | $C_{13}H_{19}NO$ | 205.29 | 6.82 | 6.89 | 124/2 | 54 | |
| $C_6H_5$ | $C_4H_9$ iso | $N(CH_3)_2$ | $C_{14}H_{21}NO$ | 219.32 | 6.39 | 6.24 | | 114 | |
| $C_6H_5$ | $CH_2CH_2OC_2H_5$ | $N(CH_3)_2$ | $C_{14}H_{21}NO_2$ | 235.32 | 5.95 | 6.18 | 134/0.3 | | 1.5138 |

*Analysis.*—Calcd. for $C_{15}H_{25}Cl_2NO$ (percent): C, 58.82; H, 8.23; N, 4.57. Found (percent): C, 58.67; H, 8.05; N, 4.39.

Certain compounds of the general Formula 1 in which X is a methylene radical and which were prepared by the process described in Examples VI and VII are shown in Table IV. The starting compounds in which X is a carbonyl radical are prepared by any of the abovedescribed processes.

TABLE IV

| Specimen | Ar | R | NR'R'' | Salt | Empirical formula | No. code | Molecular weight | Theory C | Theory H | Theory N | Theory Cl | Found C | Found H | Found N | Found Cl | B°C./p.mm./Hg | M.P., °C. | $n^{20}$ |
|---|---|---|---|---|---|---|---|---|---|---|---|---|---|---|---|---|---|---|
| 1 | $C_6H_5$ | $CH_2$—CH=$CH_2$ | $N(CH_3)_2$ | | $C_{13}H_{19}N$ | 65148 | 189.29 | 82.48 | 10.12 | 7.40 | | 82.37 | 10.08 | 7.52 | | 104/9 | | 1.5055 |
| 2 | $C_6H_5$ | $CH_2$—CH=$CH_2$ | $N(CH_3)_2$ | ClH | $C_{13}H_{20}NCl$ | 65149 | 225.76 | 69.16 | 8.93 | 6.20 | 15.71 | 68.99 | 9.07 | 6.07 | 15.67 | | 122–3 | 1.4912 |
| 3 | $C_6H_5$ | $C_5H_{11}n$ | $N(CH_3)_2$ | ClH | $C_{15}H_{26}NCl$ | 65150 | 219.36 | 82.08 | 11.49 | 6.39 | 13.86 | 82.08 | 11.36 | 6.62 | 13.73 | 111–2/3 | 164–5 | 1.4969 |
| 4 | $C_6H_5$ | $C_5H_{11}n$ | $N(CH_3)_2$ | ClH | $C_{15}H_{26}NCl$ | 61150 | 255.82 | 70.42 | 10.24 | 5.48 | | 70.39 | 10.19 | 5.62 | 16.70 | 94–5/10 | 173 | |
| 5 | $C_6H_5$ | $C_2H_5n$ | $N(CH_3)_2$ | ClH | $C_{12}H_{19}NCl$ | 65182 | 177.28 | 81.30 | 10.80 | 7.90 | 16.59 | 81.17 | 10.74 | 8.10 | 16.70 | 128/10 | | 1.4902 |
| 6 | $C_6H_5$ | $C_2H_5n$ | $N(CH_3)_2$ | ClH | $C_{13}H_{19}N$ | | 213.75 | 67.43 | 9.43 | 6.55 | | 67.29 | 9.36 | 6.34 | | | 184 (dec.) | |
| 7 | $C_6H_5$ | $C_5H_{11}$ iso | $N(CH_3)_2$ | ClH | $C_{15}H_{25}N$ | 65185 | 219.36 | 82.13 | 11.49 | 6.39 | 13.86 | 81.97 | 11.43 | 6.45 | 14.47 | | | 1.4902 |
| 8 | $C_6H_5$ | $C_5H_{11}$ iso | $N(CH_3)_2$ | ClH | $C_{15}H_{26}NCl$ | | 255.82 | 70.42 | 10.24 | 5.48 | 16.56 | 70.30 | 10.11 | 5.45 | 16.36 | 100–2/10 | 218–20 | 1.4973 |
| 9 | $C_6H_5$ | $C_5H_7$ iso | $N(CH_3)_2$ | ClH | $C_{13}H_{19}N$ | | 191.30 | 81.60 | 11.06 | 7.32 | | 81.50 | 10.11 | 7.20 | 16.36 | | | 1.6182 |
| 10 | $C_6H_5$ | $C_5H_7$ iso | $N(CH_3)_2$ | ClH | $C_{13}H_{22}NCl$ | | 227.77 | 68.55 | 9.74 | 7.48 | 15.85 | 68.65 | 9.93 | 6.15 | 15.70 | 86–7/2 | 162 | |
| 11 | $C_6H_5$ | $CH_2$—C≡CH | $N(CH_3)_2$ | ClH | $C_{13}H_{17}N$ | 6643 | 187.27 | 83.37 | 9.15 | 7.48 | 15.85 | 83.37 | 9.25 | 7.39 | 15.70 | 86–7/2 | 162 | 1.4937 |
| 12 | $C_6H_5$ | $CH_2$—C≡CH | $N(CH_3)_2$ | ClH | $C_{13}H_{18}NCl$ | 6657 | 223.74 | 69.78 | 8.11 | 6.26 | 15.85 | 69.75 | 8.30 | 6.30 | 15.70 | 104–6/10 | 139 | |
| 13 | $C_6H_5$ | $C_3H_7n$ | $N(CH_3)_2$ | ClH | $C_{13}H_{21}N$ | | 191.30 | 81.61 | 11.07 | 7.32 | | 81.93 | 10.99 | | 15.38 | | | |
| 14 | $C_6H_5$ | $C_3H_7n$ | $N(CH_3)_2$ | ClH | $C_{13}H_{22}NCl$ | | 227.77 | 68.55 | 9.74 | 6.15 | 15.56 | 58.48 | 9.94 | 6.19 | | | | |
| 15 | $C_6H_5$ | $(CH_2)_3N(CH_3)_2$ | $N(CH_3)_2$ | | $C_{15}H_{26}N_2$ | 6662 | 234.37 | | | | | | | | | | | |
| 16 | $C_6H_5$ | $(CH_2)_3N(CH_3)_2$ | $N(CH_3)_2$ | 2ClH | $C_{15}H_{28}N_2Cl_2$ | | 307.30 | | | | | | | | | | | |
| 17 | $C_6H_5$ | $C_4H_9$ sec | ⟨N⟩ | | $C_{16}H_{25}NO$ | 6664 | 247.37 | 77.68 | 10.19 | 5.66 | | 77.88 | 9.99 | 5.73 | | 128–9/2 | | 1.5156 |
| 18 | $C_6H_5$ | $C_4H_9$ sec | ⟨N⟩ | ClH | $C_{16}H_{26}NOCl$ | | 283.83 | 67.70 | 9.23 | 4.93 | 12.49 | 67.53 | 9.20 | 5.03 | 12.38 | | 178–80 (dec.) | |
| 19 | $C_6H_5$ | $C_4H_9$ iso | $N(CH_3)_2$ | | $C_{14}H_{23}N$ | 66102 | 205.33 | 81.88 | 11.29 | 5.79 | | | | | | | | |
| 20 | $C_6H_5$ | $C_4H_9$ iso | $N(CH_3)_2$ | ClH | $C_{14}H_{24}NCl$ | | 241.80 | 69.54 | 10.01 | 5.79 | 14.66 | | | | | | | |
| 21 | $C_6H_5$ | $CH_3$—C—OH $\ C_2H_5$ | $N(CH_3)_2$ | | $C_{14}H_{23}NO$ | 66124 | 221.33 | 75.97 | 10.47 | 6.33 | | 75.63 | 10.18 | 6.33 | | 101/0.1 | | 1.5123 |
| 22 | $C_6H_5$ | $CH_3$—C—OH $\ C_2H_5$ | $N(CH_3)_2$ | ClH | $C_{14}H_{24}NOCl$ | | 257.80 | 65.22 | 9.38 | 5.43 | 13.75 | 65.12 | 9.20 | 5.36 | 13.69 | | 160 | |
| 23 | p.ClC$_6$H$_4$ | $C_4H_9$ sec | $N(CH_3)_2$ | | $C_{14}H_{22}Cl$ | 66126 | 239.78 | 70.12 | 9.25 | 5.84 | | 70.01 | 9.28 | 5.75 | | 95–8/0.1 | | 1.5131 |
| 24 | p.ClC$_6$H$_4$ | $C_4H_9$ sec | $N(CH_3)_2$ | ClH | $C_{14}H_{23}NCl_2$ | 66203 | 276.25 | 60.87 | 8.29 | 5.07 | 13.75 | 60.80 | 8.54 | 6.38 | 13.89 | 210–5 (dec.) | | 1.4911 |
| 25 | $C_6H_5$ | $CH_2CH_2OC_2H_5$ | $N(CH_3)_2$ | ClH | $C_{14}H_{23}NO$ | | 221.33 | 75.97 | 10.47 | 6.33 | | 75.85 | 10.25 | 6.58 | | 107/3 | | |
| 26 | $C_6H_5$ | $CH_2CH_2OC_2H_5$ | $N(CH_3)_2$ | ClH | $C_{14}H_{24}ClNO$ | 66204 | 257.80 | 65.22 | 9.38 | 5.43 | 13.75 | 65.34 | 9.52 | 5.58 | 13.89 | | 155 | |
| 27 | $C_4H_3S$ | $C_4H_9$ sec | $N(CH_3)_2$ | ClH | $C_{12}H_{21}NS$ | | 211.36 | 68.19 | 10.02 | 6.63 | | 68.10 | 9.75 | 6.54 | 14.21 | 115–120/0.1 | 200 (dec.) | |
| 28 | $C_4H_3S$ | $C_4H_9$ sec | $N(CH_3)_2$ | ClH | $C_{12}H_{22}ClNS$ | 6724 | 247.83 | 58.15 | 8.95 | 5.65 | 14.30 | 58.58 | 8.84 | 4.58 | 14.21 | 115–120/0.1 | 240–5 (dec.) | |
| 29 | p.NH$_2$C$_6$H$_4$ | $C_4H_9$ sec | $N(CH_3)_2$ | 2 HCl | $C_{14}H_{24}N_2$ | | 220.35 | 76.31 | 10.98 | 12.71 | 24.17 | 76.39 | 10.81 | 12.88 | 23.97 | | | |
| 30 | p.NH$_2$C$_6$H$_4$ | $C_4H_9$ sec | $N(CH_3)_2$ | | $C_{14}H_{26}Cl_2N_2$ | 6768 | 293.28 | 57.33 | 8.94 | 9.55 | | 57.41 | 9.05 | 9.33 | | | | |
| 31 | p(OCH$_3$)C$_6$H$_4$ | $C_4H_9$ sec | $N(CH_3)_2$ | ClH | $C_{15}H_{25}NO$ | | 235.36 | | | | | | | | | 136–7/5 | 187 | |
| 32 | p(OCH$_3$)C$_6$H$_4$ | $C_4H_9$ sec | $N(CH_3)_2$ | ClH | $C_{15}H_{26}ClNO$ | | 271.83 | 66.27 | 9.64 | 5.15 | 13.04 | 66.49 | 9.67 | 5.18 | 12.95 | | | |
| 33 | OHC$_6$H$_4$(p) | $C_4H_9$ sec | $N(CH_3)_2$ | HCl | $C_{14}H_{24}ClNO$ | 67142 | 257.80 | 65.22 | 9.38 | 5.43 | | 65.83 | 9.45 | 5.40 | | | 160–5 | |

EXAMPLE VIII

1-amino-3-methyl-2 phenyl pentane

This compound was prepared according to the schematic process

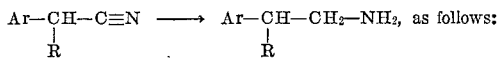

0.2 mol of 1-cyano-2-methyl-1-phenyl butane dissolved in 40 ml. anhydrous ether is added to a suspension of 0.2 mol of LiAlH$_4$ in 400 ml. anhydrous ether. After four hours under reflux hydrolysis is effected, the voltaile solution is concentrated, and a residue is obtained which is distilled.

E/20=134° C.

Certain compounds of the general Formula 1 in which X is a methylene radical and which were prepared by the process described in Example VIII are shown in Table V.

TABLE V

| Specimen | Ar | R | NR'R'' | Salt | Empirical formula | Molecular weight | Theory C | Theory H | Theory N | Theory Cl | Found C | Found H | Found N | Found Cl | E° C./p. mm./Hg | M.P. ° C. (dec.) | $n^{20}$ |
|---|---|---|---|---|---|---|---|---|---|---|---|---|---|---|---|---|---|
| 1 | C$_{10}$H$_7$ | sec C$_4$H$_9$ | NH$_2$ |  | C$_{16}$H$_{21}$N | 227.34 | 84.53 | 9.31 | 6.16 |  | 84.46 | 9.47 | 6.14 |  | 140/0.2 |  | 1.5888 |
| 2 | C$_{10}$H$_7$ | sec C$_4$H$_9$ | NH$_2$ | HCl | C$_{16}$H$_{22}$N Cl | 291.85 | 72.84 | 8.41 | 5.31 | 13.44 | 72.88 | 8.41 | 5.39 | 13.26 |  |  |  |
| 3 | C$_6$H$_{11}$ | sec C$_4$H$_9$ | NH$_2$ |  | C$_{12}$H$_{25}$N | 183.32 |  |  |  |  |  |  |  |  | 134/20 |  |  |

EXAMPLE IX

1-dimethylamino-3-methyl-2-phenyl pentane

This compound was prepared according to the schematic process

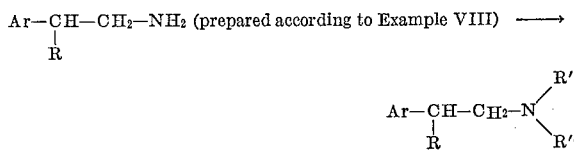

as follows:

A mixture of 0.1 mol of 1-amino-3-methyl-2-phenyl pentane is placed under reflux for 12 hours with 0.5 mol of formic acid (98%) and 0.22 mol of 30% formaldehyde solution. Then 10 ml. of concentrated HCl is added before evaporating to dryness. The residue is taken up with water, the solution rendered alkaline and extracted with ether. The di-substituted amine is obtained by distillation.

E/4=97–98° C. (yield=60%)

Certain compounds of the general formula (1) in which X is a methylene radical, and which are prepared by the process described in Example IX are shown in Table VI.

EXAMPLE X

1-dimethylamino-3-methyl-2(2-quinolyl) pentane

This compound was prepared according to the method of applying the Mannich reaction to the Ar—CH$_2$—R derivatives in the following manner:

(a) 2-methyl-4-(2-quinolyl) butane, was first prepared by adding 0.5 mol quinaldine to a suspension of 0.5 mol sodamide in liquid ammonia, and after two hours 0.5 mol of secondary butyl bromide is introduced. After evaporation of the ammonia, extraction is effected with ether and distillation carried out.

E/9=149° C. (yield=60%)

(b) 1 - dimethylamino-3-methyl-2(2-quinolyl) pentane was prepared from this compound by the following process:

A mixture of 0.165 mol of the butane derivative, 0.5 mol of dimethylamine hydrochloride, 15 g. trioxymethylene and 100 ml. amyl alcohol is kept under reflux with stirring for 10 minutes. 100 ml. of water is then added, the aqueous solution is rendered alkaline with concentrated soda, extracted with ether and concentrated. The residue is distilled to give the desired product:

E/8=175–176° C. (yield=70%)

Analysis.—Calcd. for C$_{17}$H$_{24}$N$_2$ (percent): C, 79.64; H, 9.44; N, 10.93. Found (percent): C, 79.54; H, 9.27; N, 11.27.

According to the same process 1 - dimethylamino-3-methyl-2-(2-quinoxalyl) pentane was prepared.

Eb/0.05=137–138° C.

Analysis.— Calcd. for C$_{16}$H$_{23}$N$_3$ (percent): C, 74.66; H, 9.01; N, 16.33. Found (percent): C, 74.44; H, 9.07; N, 16.37.

EXAMPLE XI

1-dimethylamino-2-(2-pyridyl)-3-methyl pentane

This compound was prepared according to the schematic process

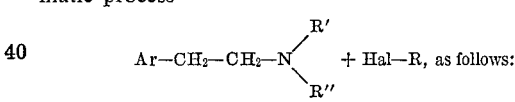

An ether solution of dimethylamino-2-ethyl pyridine (0.5 mol) was added to a suspension of sodamide in liquid ammonia (0.5 mol). After two hours under reflux 0.5 mol of secondary butyl bromide is added and the solution is reacted for two hours.

After evaporation of the ammonia, the solution is taken up in 400 ml. water and 400 ml. ether. The volatile phase, decanted and then concentrated, gives an oily residue which is distilled:

E/0.3=85° C. (yield=81%)

Analysis.—Calcd. for C$_{13}$H$_{22}$N$_2$ (percent): C, 75.67; H, 10.75; N, 13.58. Found (percent): C, 75.87; H, 10.91; N, 13.80.

The resultant base is treated in solution in ethyl acetate with the equivalent of maleic acid. The acid maleate is obtained by recrystallization from a mixture of isopropyl alcohol and isopropyl ether (1/4). M.P.=100–102° C.

Analysis.—Calcd. for C$_{17}$H$_{26}$N$_2$O$_4$ (percent): C, 63.34; H, 8.13; N, 8.69. Found (percent): C, 63.22; H, 7.88; N, 8.74.

1-dimethylamino-(2-pyridazinyl) 3-methyl pentane was also prepared in the same manner.

TABLE VI

| Specimen | Ar | R | NR'R'' | Salt | Empirical formula | Molecular weight | Theory C | Theory H | Theory N | Theory Cl | Found C | Found H | Found N | Found Cl | E° C./p. mm./Hg | M.P. ° C. (dec.) | $n^2{}_D$ |
|---|---|---|---|---|---|---|---|---|---|---|---|---|---|---|---|---|---|
| 1 | H | sec C$_4$H$_9$ | N(CH$_3$)$_2$ |  | C$_8$H$_{19}$N | 129.24 | 74.34 | 14.82 | 10.84 |  | 74.52 | 14.71 | 10.95 |  | 138-40/760 |  | 1.414 |
| 2 | H | sec C$_4$H$_9$ | N(CH$_3$)$_2$ | HCl | C$_8$H$_{20}$NCl | 165.71 | 57.98 | 12.17 | 8.45 | 21.40 | 57.92 | 12.21 | 8.45 | 22.06 |  | 215 |  |
| 3 | C$_6$H$_{11}$ | sec C$_4$H$_9$ | N(CH$_3$)$_2$ |  | C$_{14}$H$_{29}$N | 211.38 | 79.54 | 13.83 | 6.63 |  | 79.66 | 13.85 | 6.74 |  | 97-8/4 |  |  |
| 4 | C$_6$H$_{11}$ | sec C$_4$H$_9$ | N(CH$_3$)$_2$ | HCl | C$_{14}$H$_{30}$ClN |  | 67.84 | 12.20 | 5.65 | 14.31 | 67.81 | 11.98 | 5.57 | 14.39 |  |  |  |

*Analysis.*—Calcd. for $C_{12}H_{21}N_3$ (percent): C, 69.52; H, 10.21; N, 20.27. Found (percent): C, 69.30; H, 10.00; N, 20.45, and its monomaleate:

*Analysis.*—Calcd. for $C_{16}H_{25}N_3O_4$ (percent): C, 59.42; H, 7.79; N, 13.00. Found (percent): C, 59.39; H, 7.75; N, 12.88.

The above-mentioned compounds according to the present invention were studied on animals in the laboratory and it was possible to demonstrate cardiovascular, diuretic and spasmolytic activities of an interesting nature.

(A) Cardiovascular activity

When administered by intravenous injection to dogs, cats, rabbits or rats, some of the described substances, in particular the hydrochloride of 1-dimethylamino-3-methyl-2-(α-naphthyl) pentane and the hydrochloride of 1-dimethylamino-3-methyl-2-cyclohexyl pentane cause hypotension.

However, other substances such as the hydrochloride of 1 - dimethylamino - 3 - methyl-2[(5-chloro 2-methoxy) phenyl] pentane and the monomaleate of 1-dimethylamino-2-(2-pyridyl) 3-methyl pentane cause lasting hypotension.

Substances having a hypertensive effect cause peripheral vaso-constriction shown by the amount of the supply of an intra-arterial transfusion effected under constant pressure on rabbits, the products being administered directly in the transfusion.

(B) Diuretic activity

Some of the described substances have interesting diuretic properties observed on rats and dogs and have a bearing on the elimination of water and ions. This concerns more particularly 1-dimethylamino-3-methyl-2-(5-chloro-2-methoxy) phenyl pentane hydrochloride and 1-dimethylamino-(2-pyridyl)-2-methyl pentane monomaleate.

(C) Spasmolytic action

Some derivatives have a spasmolytic action demonstrated on the isolated duodenum of the rat and on the uterus in situ, in particular 1-dimethylamino-2-phenyl heptane hydrochloride.

Some of these derivatives have been studied particularly, for example:

(1) 1 - dimethylamino - 3 - methyl-2-(5-chloro-2 methoxy) phenyl pentane hydrochloride: its diuretic activity is shown on rats in a dose of 5 mg./kg. administered orally and on dogs in a dose of 25 mg./kg. administered intraduodenally. The product is hypotensive from 2 mg./kg. administered intravenously on dogs and rabbits. It is slightly vasodilatatory. Moreover, it has a vagolytic activity: it suppresses the tensional effects of acetyl choline and vagal excitation and on the isolated organ it has atropinic properties.

Its $LD_{50}$ is 115 mg./kg. orally and 25 mg./kg. intravenously on mice.

(2) 1-dimethylamino-3-methyl-2-(1-naphthyl) pentane hydrochloride.

This product is hypertensive from 0.5 mg./kg. on dogs intravenously. It has a vasoconstrictor effect in a dose of 250 μg. injected in the artery whose supply is being studied. It has mixed spasmolytic, papaverinic and atropinic properties, the first being equivalent to 0.5 part of papaverine on the isolated duodenum of the rat treated with barium chloride and on the uterus of the rat in situ: the second equivalent to 0.01 part of atropine.

Its $LD_{50}$ is 15.5 mg./kg. intravenously and 100 mg./kg. orally on mice.

These cardiovascular, diuretic and spasmolytic properties make the derivatives of the present invention useful medicines in the treatment of various ailments such as hypertension, circulatory disorders of the extremities, oedemas and spasmodic ailments.

The present invention also concerns the various pharmaceutical forms for administration orally, for rectal, parenteral or local administration and comprise one or more of the derivatives of Formula 1 and/or their salts as an active principle.

These pharmaceutical forms may be simple tablets, sugar-coated pills or pellets for intestinal or delayed disintegration capsules, solutions to be taken orally or injected, suppositories, creams, pommades or lotions and are prepared according to the art with suitable excipients for the selected form, such as talcum, starch, lactose, magnesium stearate, polyoxyethylene glycols, resins, gelatine, aqueous or oily vehicles, natural or synthetic excipients for suppositories, creams and pommades, coloring agents, aromatic agents, wetting agents, and various buffers.

The active therapeutic doses depend on the subject and gravity of the case. In general, the daily dose taken orally by humans increases from 0.001 to 0.1 g.

The embodiments of the invention in which an exclusive property or privilege is claimed are defined as follows:

1. A compound of the formula

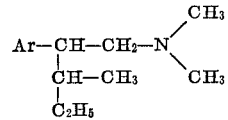

wherein Ar is selected from the group consisting of pyridyl and pyridazinyl and nontoxic acid addition salts thereof.

2. A compound according to claim 1, in which Ar is pyridyl.

3. A compound according to claim 1, in which Ar is pyridazinyl.

References Cited

UNITED STATES PATENTS 2,918,470   12/1959   Krapcho et al.   260—288

OTHER REFERENCES

Wibaut et al.: Chem. Abstracts, vol. 50, pp. 5657–8, April 1956.

Cope et al.: J. Org. Chem., vol, 31, 100, pp. 3093–98, October 1966.

ALAN L. ROTMAN, Primary Examiner

U.S. Cl. X.R.

260—247.2, 247.5, 256.4, 293, 294, 295, 296, 286, 288, 329, 332.2, 347.3, 347.7, 309.2, 326.85, 558, 563, 570.5, 570.6, 570.8, 583, 999